United States Patent [19]
Ward

[11] 3,899,062
[45] Aug. 12, 1975

[54] FAIL-SAFE DISENGAGEMENT MECHANISM

[76] Inventor: Raymond L. Ward, 2 Monadnock Rd., Worcester, Mass. 01609

[22] Filed: Oct. 31, 1974

[21] Appl. No.: 519,431

[52] U.S. Cl............................. 192/129 R; 100/53
[51] Int. Cl.². ........................ F16P 7/00; F16D 9/00
[58] Field of Search ...... 100/53; 192/129 R; 83/397

[56] References Cited
UNITED STATES PATENTS

| | | | |
|---|---|---|---|
| 1,519,369 | 12/1924 | Elmer............................. | 192/129 R |
| 1,997,101 | 4/1935 | Brush et al..................... | 192/129 R |
| 2,306,949 | 12/1942 | Ipsen.............................. | 192/129 R |
| 2,328,524 | 8/1943 | Becker........................... | 192/129 R |
| 3,147,836 | 9/1964 | Atkinson........................ | 192/129 R |

*Primary Examiner*—Billy J. Wilhite
*Attorney, Agent, or Firm*—Frank A. Steinhilper; Alfred H. Rosen

[57] ABSTRACT

A machine or tool such as a mechanical power press for a manufacturing facility has a wholly mechanical safety device to require all moving parts to return to their original position before starting a new cycle of operation. in the safety control a driving plate and a driven plate have a common cam follower. The driving plate is activated, whereby spring loading forces the cam follower to drive the driven plate and then to follow a cam path out of engagement with the driven plate. Return of the driving plate to its original position permits re engagement between the cam follower and the driven plate.

4 Claims, 5 Drawing Figures

FAIL-SAFE DISENGAGEMENT MECHANISM

BACKGROUND OF THE INVENTION

In press shops there are many tools and other apparatus which have dangerous characteristics causing serious safety hazards. One such type of dangerous tool is a mechanical power press such as a press, a punch or a machine having a press or punch-like action. In the ordinary course of use of such tools, a work-piece is placed in or on the tool and the tool is activated to operate on the work-piece. The work-piece then is repositioned or is removed and replaced by a different work-piece which in turn is pressed or punched. One of the dangers in the machine of this sort is that the punch-press mechanism may be activated while the operator is exchanging one work-piece for the next or is moving the work piece to a different position for a next operation. The danger can occur in a number of ways, but one of the avenues toward danger is in the machine in which the operating button, operating pedal, or other operating means is energized and not fully released. There is, in such a case, the danger that the operator may, for example, put his foot on a foot pedal, cause the machine to operate and then reach into the machine to change work-pieces while the depressed foot pedal continues to be partly or fully depressed, causing the machine to operate through a subsequent cycle. Because normal machine operation often requires the workman to exchange work-pieces right at the position where the press or punch operation takes place, a single mistake in machine operation is distressingly likely to cause the human being to lose his hand.

A danger of this sort is an everpresent danger. Even with the most serious and diligent of educational programs, it has generally been found impossible to create operating procedures which are foolproof, and accordingly it is necessary to produce machines which themselves include built-in safety protection which when properly maintained and adjusted is essentially fail-safe. In addition to ordinary human concern, the need for true protection against hazardous operations has recently been strengthened through the setting of government enforced safety regulations. Accordingly, the need is very real not only in terms of human safety, but also in terms of definitive government standards which must be met.

GENERAL NATURE OF THE INVENTION

The present invention is an actuating device for a press, a punch, or a tool or machine for a similarly dangerous operation in a manufacturing operation. The machine is operable for a single operation, and the present invention insures that the machine and its control must be returned completely to the neutral position before it can be operated for a second operation. In the safety mechanism a driving plate is mounted to be operated by mechanical or electrical mechanical means, usually a foot pedal. To initiate a tool cycle the drive plate is rotated by the foot pedal, releasing a cam follower which in turn releases a driven plate. The driving plate is shaped and positioned to carry the cam follower in a disengaged condition until the operating means, or foot pedal, is completely released. The two plates cannot again be operated until both the drive plate and the driven plate have completed the cycle and returned to the original preoperating position. In brief, a pulling motion imparted to a first rod is transmitted a single time to a second rod, and the pulling motion cannot be transmitted a second time until the entire apparatus has been returned to its starting position. The second rod is the normal actuating device to make the machine operate.

The safety mechanism or apparatus can be built into a new machine or tool or may be installed on an existing machine or tool by inserting it into the mechanical portion of operating mechanism of the machine.

The invention is more fully illustrated in the drawings in which.

DETAILED DESCRIPTION OF THE INVENTION

Figure 1:
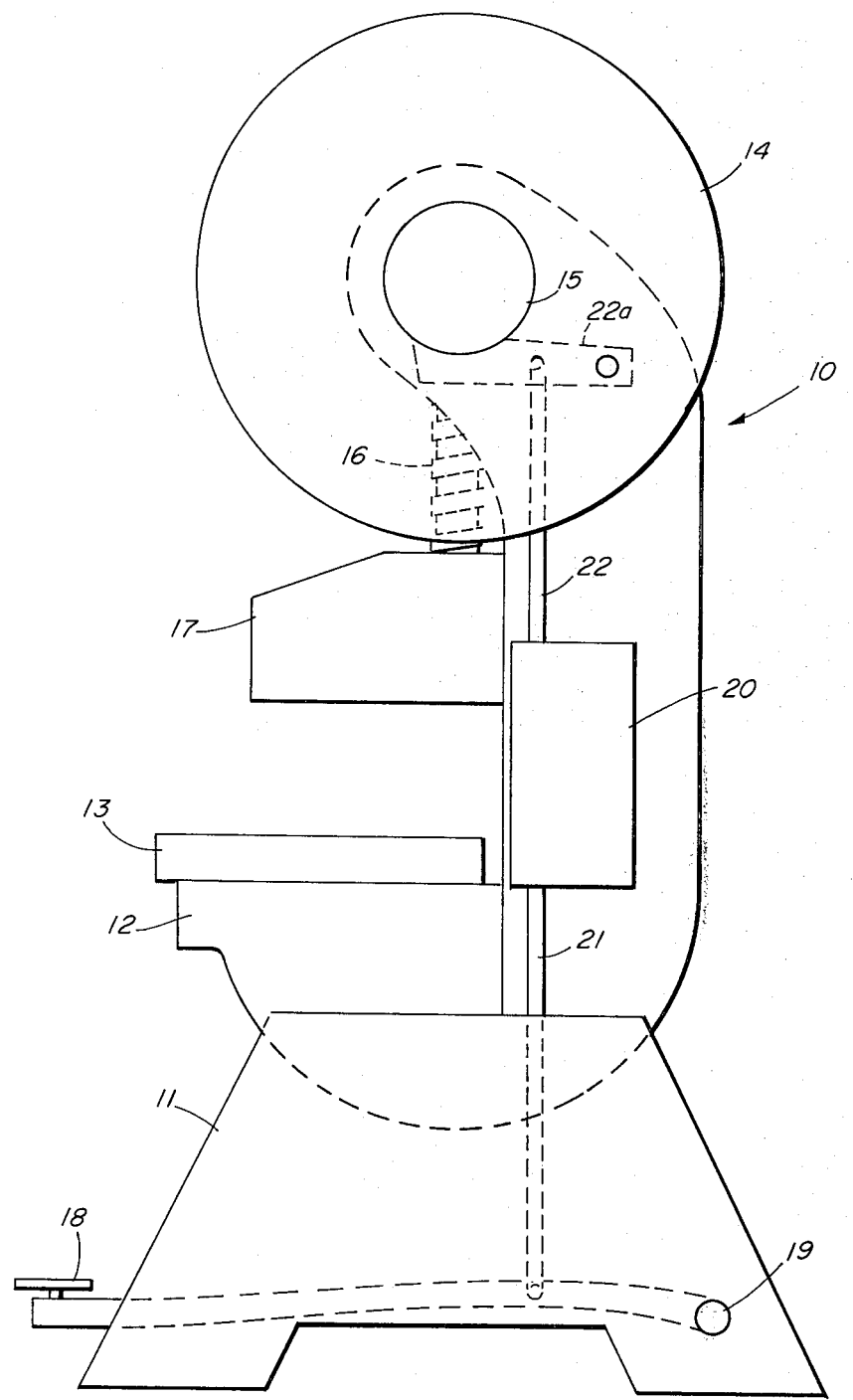
FIG. 1 is a diagramatic view of a machine which is safetyprotected according to the present invention.

In FIG. 1 is illustrated a tool or machine generally designated 10 according to one form of the invention. The machine as illustrated is, in outline, a machine of the punch or press type such as is normally found in a manufacturing plant, in a machine shop or in another wood or metal working facility. In general outline, the machine includes a stand or frame 11 on which is mounted a fly wheel 14 rotating on hub 15 to operate a working member on ram 17. Mounted on stand 11 is a table 12, and in FIG. 1 a work-piece 13 is shown positioned on the table. Ram 17 is adapted to be driven down to press or punch work-piece 13 in the conventional manner; adjusting screw 16 can be set to predefine the motion of ram 17. As is conventional, this machine has a foot pedal 18 operating a control lever pivoted on pivot 19 to pull rod 21 downward.

Mounted on frame or stand 11 is a box or cabinet 20 which is normally covered with a cover. In FIGS. 2 to 5 the cover is removed to show the apparatus position within box 20. The apparatus is operable to transmit a vertical displacement of a first rod 21 to an operating lever or second rod 22 connected to a conventional actuating mechanism or clutch 22a also mounted on a stand or frame 11. In a conventional tool or machine of the sort illustrated in FIG. 1, rod 21 itself directly connects with a clutch to operate the ram 17 and thus work the machine, and the apparatus in cabinet 20 is an operational safety device inserted in the normal drive train of such a machine. In normal use and operation, the operator or machinist steps on pedal 18 thereby activating safety control 20 to engage the clutch and causing the machine to operate through one cycle.

Figure 2:
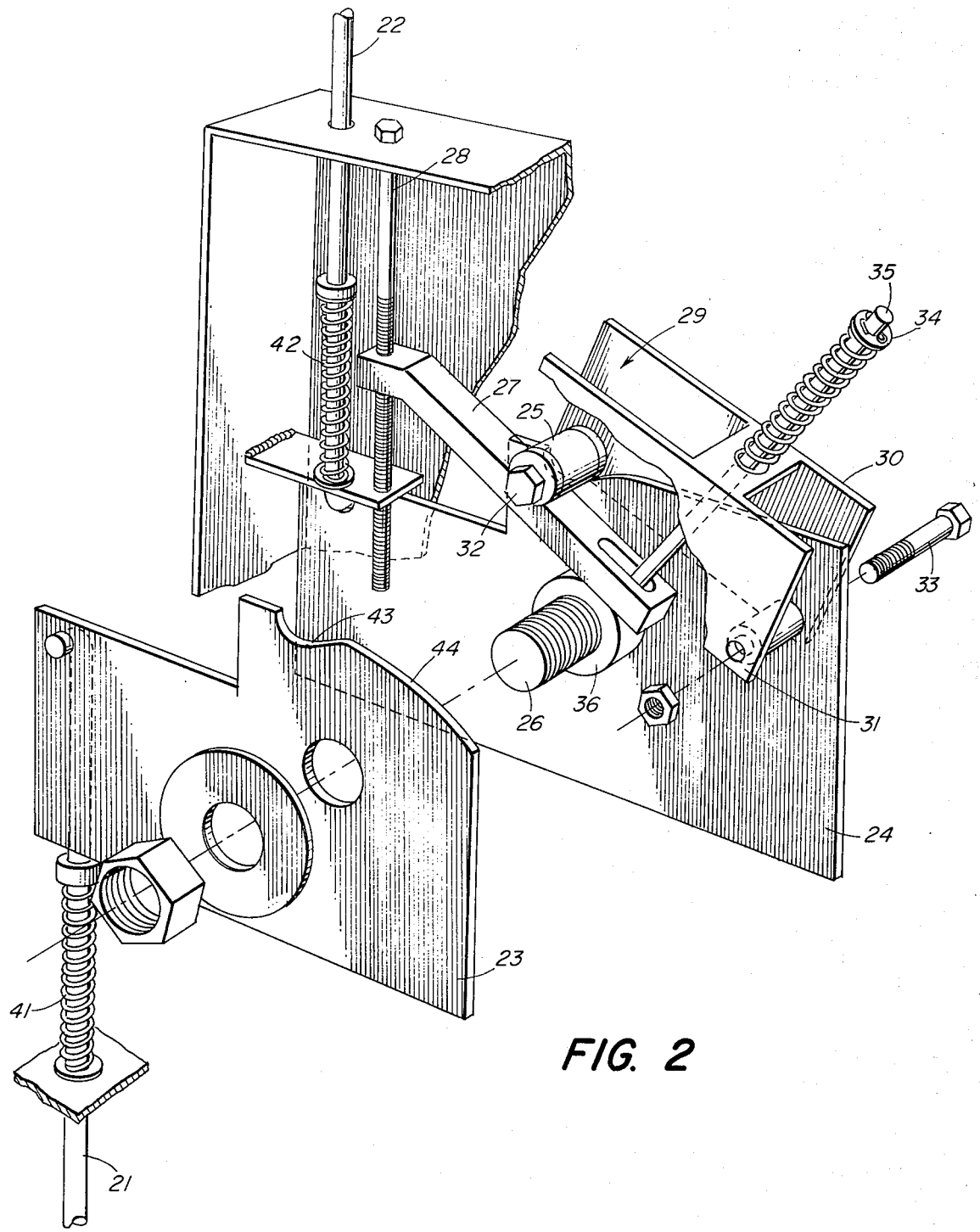
FIG. 2 is an exploded perspective view of the safety protection apparatus according to one embodiment of the invention.

In FIG. 2 is illustrated the safety control mechanism of the present invention. The purpose accomplished by this control mechanism is that vertical movement of a first rod 21 is transmitted to control lever or second rod 22 when pedal 18 is depressed and thereafter interaction between rod 21 and control rod 22 is prevented until the machine has completed its operational cycle and pedal 18 is completely released to its starting position. The normal operation of the machine 10 is thus modified so that stepping on pedal 18 causes the machine to operate through one and only one cycle.

The device illustrated in FIG. 2 is designed as a fail-safe disengagement mechanism for the purpose of the disengagement of a linear coupling by purely a mechanical means, and is essentially fail safe as long as it is well maintained. It is composed of a series of rods, cams and springs and whose basic application is in connection with the clutch engaging on existing mechanical presses, so as to bring them into conformity with the proposed regulation of the Occupational Safety and Health Act, as found in the regulations, as indicated and further defined in ANS1-B11.1-1971.

The device can be adapted for use on other manual or powered applications wherein the same disengagement capability is desired.

The device is activated by the application of pressure on foot pedal 18. Upon activation rod 22 engages the press clutch which in turn starts a crank shaft cycle. Immediately on the start of the cycle the device disengages, allowing the press to complete one cycle and returning all mechanism to the neutral position for the start of another cycle that connot take place without depressing the foot pedal again after it has been returned to its neutral position. The mechanical operations of the clutch and its operation to activate the machine are conventional and need not be shown in detail.

In FIG. 2 is shown means to transmit a pulling motion from rod 21 to rod 22. An adjustable cam path 27 member is positioned adjacent to a mechanical drive means shown as a driving cam plate 23 and a mechanical driven means shown as driven cam plate 24. A cam follower 25 mounted on axle 32 connects plates 23 and 24. Both plates pivot on a single axle 26. The cam follower 25 is held on a cam path member 27 which pivots at one end around axle 26, and rides on a timing screw 28 at the other end. The screw 28 adjusts the angle of cam path 27 relative to cam follower 25. The cam follower 25 is held down on the cam path by a frame 29 having two side plates 30 and 31 which in turn is held in pressure engagement by spring 34. Cam follower 25 is rotatably mounted on axle 32 which is held between the two side plates 30 and 31. Frame 29 pivots on a third axle 33 that is fixed to the driven cam plate 24. Spring 34 is pinned at its upper end to concentric rod 35, which is tied at its bottom end to collar 36 around the first axle 26 and supplies the force to hold the cam follower 25 down on the cam path 27. The two cam plates 23 and 24 are inside the side plates 30 and 31 of the frame 29. Springs 41 and 42 on rods 21 and 22, respectively, are return springs.

Figure 3:
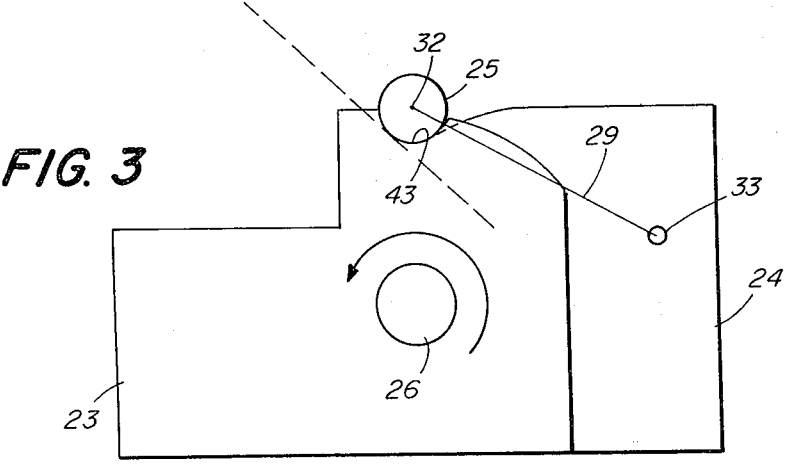
FIG. 3 is a front view of a portion of the apparatus of FIG. 2 illustrated in a starting position.
Figure 4:
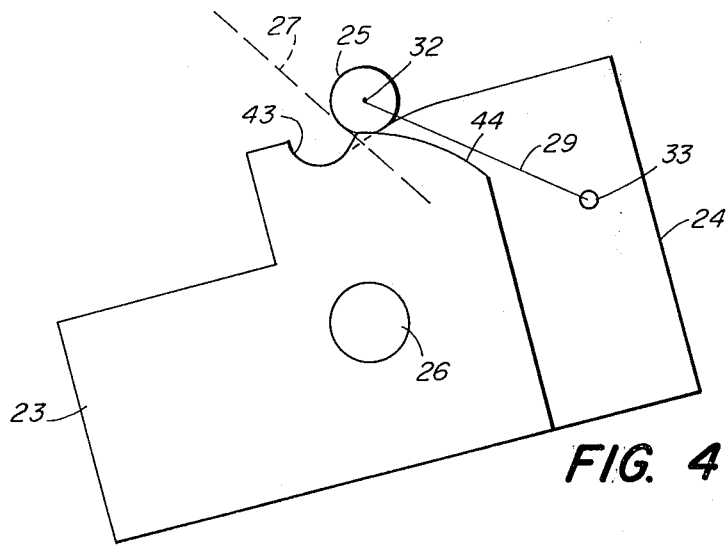
FIG. 4 is a front view of the apparatus of FIG. 3 in an operating position.
Figure 5:
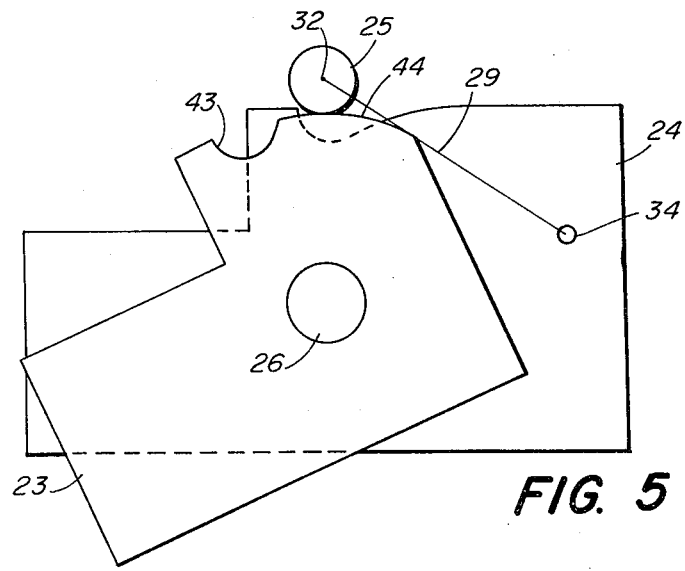
FIG. 5 is a front view of the apparatus of FIG. 2 in its safety position.

The action of the device is shown in the sketches (FIGS. 3 to 5 of the cam plates 23 and 24 and the cam follower 25). In Frame 29 is a fixed link between pivot 33 on plate 24 and axle 32 of the cam follower 25. At an adjustable point in the counterclockwise rotation of the driving cam plate 23 and the driven cam plate 24, cam path 27 forces cam follower 25 away from notch 43 in the driving cam plate as shown in FIG. 4. Upward adjustment of cam path member 27 adjusts the release point to be at an earlier point in the motion. This action disengages the two cam plates 23 and 24 as shown in FIG. 5. The driven cam plate 24 returns to its starting position under force of the restoring spring 42. Thereafter further pull on rod 21 has no effect on rod 22, as is apparent in FIG. 4. When rod 21 is released, its restoring spring 41 returns driving cam plate 23 clockwise to re-engage driven plate 24 through cam follower 25; this completes one operating cycle.

The mechanical drive means 23 and driven means 24 are illustrated as rotatably mounted plates having similarly contoured upper edges along which the cam follower 25 will ride. In each of plates 23 and 24, this contoured edge includes a notch 43 in which cam follower 25 is seated when in the rest position. Plate 23 has a shoulder 44. When drive plate 23 is rotated in the counterclockwise direction (see FIG. 4), cam follower 25 is forced out of notches 43, causing plate 24 to rotate clockwise. Rotation further of plate 23 counterclockwise brings shoulder 44 into operating position to prevent seating of cam follower 25 in notch 43, until plate 23 is returned by clockwise rotation to its rest position.

The angle of cam path 27 is fixed by the screw 28. Link 29 pushes the cam follower 25 up the cam path 27 as the driven plate 24 rotates counterclockwise under drive from driving plate 23, until the cam follower breaks away from the driving plate. Then driven plate 24 returns by clockwise rotation to its starting position. Only after both driving plate 23 and driven plate 24 are returned to the starting position shown in FIG. 3 can the cam follower seat in the driven plate, and only then will a next motion on rod 21 be transmitted to rod 22.

The safety protection afforded by the present invention fully meets safety requirements of Government regulations as we know them to be at this time. It is completely mechanical and is not rendered inoperative by electrical failure. It is readily and inexpensively installed on existing machines. It does not require new, strange operating procedures, and thus avoids the need for training operators to special techniques and eliminates the dangers inherent in unfamiliar procedures. The operator simply does what he always has done, and the machine itself, equipped with the new safety device, protects the operator from accident.

I claim:

1. A safety device for a mechanical tool of the punch-press type having machine operating means, actuating means adapted to initiate operation of the machine operating means for a cycle of operation, and a safety means connecting said actuating means and said operating means adapted to transmit an actuating signal mechanically from said actuating means to said operating means for a single cycle of operation and to interrupt said operating means after completion of one and only one cycle of machine operation, said safety means comprising:

a pivotally mounted drive member connected and mounted to rotate between a first rest position and a second actuated position means connecting said actuating means to drive said member to rotate said drive member to said actuated position in response to an actuating signal;

a pivotally mounted driven member rotatable between a rest position and an actuated position;

a force loaded cam follower positioned and adapted to bear against both of said drive member and said driven member in said rest positions and to drive said driven member rotationally when said drive member is rotated;

a cam path member positioned adjacent to said cam follower and positioned to receive said cam follower when the drive member and driven member are moved from said rest positions toward said actuated positions, said cam path member being disposed to disengage said force loaded cam follower from said driven member in its actuated position;

a cam surface on said drive member shaped to receive and hold said cam follower in a rest position disengaged from said cam path member and shaped to form a cam path out of engagement with said driven member when said drive member is in the actuated position;

a cam surface on said driven member shaped to receive said cam follower in said rest position;

force loading means connected with the driven member to force said driven member to its rest position when said actuating means is released;

and means mechanically connected to said driven member to transmit mechanical motion to said machine operating means to cause engagement of said machine operating means when said cam follower bears on and rotates said driven member;

whereby actuation of said actuating means releases said cam follower from said drive member to drive said driven member and to operate said machine, and whereby the cam surface of said driving plate holds said cam follower out of engagement with the driven member during machine operation and until said drive member is returned to its rest position.

2. A safety device according to claim 1, wherein said drive member and said driven member are spring-loaded to return them to the rest position when said actuating means is released.

3. A safety device according to claim 2, wherein a mechanical member connects said actuating device to said drive member to transmit a mechanical signal by longitudinal motion to said drive member, and wherein said driven member imparts longitudinal motion to said machine operating means.

4. A safety device according to claim 1, wherein said drive member and said driven member are plate members having cam surfaces including a recess in the cam surface of each plate to receive a cam follower in a rest position and a shoulder surface to guide the cam follower out of engagement with said recesses in the actuated position.

* * * * *